(12) United States Patent
Kim et al.

(10) Patent No.: US 9,413,441 B2
(45) Date of Patent: Aug. 9, 2016

(54) APPARATUS AND METHOD FOR SPATIAL FILTERING BY ESTIMATING ANGLE OF DEVIATION FOR LINE OF SIGHT OF USER

(71) Applicant: Electronics and Telecommunications Research Institute, Daejeon (KR)

(72) Inventors: Seon-Ae Kim, Daejeon (KR); Young-Hoon Kim, Daejeon (KR); Byung-Jae Kwak, Daejeon (KR); Soo Chang Kim, Daejeon (KR); Seung Chan Bang, Daejeon (KR); Moon-Sik Lee, Daejeon (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 0 days.

(21) Appl. No.: 14/865,260

(22) Filed: Sep. 25, 2015

(65) Prior Publication Data

US 2016/0112101 A1    Apr. 21, 2016

(30) Foreign Application Priority Data

Oct. 20, 2014  (KR) .......................... 10-2014-0142049

(51) Int. Cl.
*H04B 7/04* (2006.01)
*H04W 72/04* (2009.01)

(52) U.S. Cl.
CPC ........... *H04B 7/0456* (2013.01); *H04W 72/046* (2013.01)

(58) Field of Classification Search
USPC ............................ 375/343; 345/174; 370/328
See application file for complete search history.

(56) References Cited

U.S. PATENT DOCUMENTS

2013/0099973 A1    4/2013   Kwak

FOREIGN PATENT DOCUMENTS

JP          2011160446 A    8/2011
KR      1020130044191 A    5/2013

*Primary Examiner* — Eva Puente
(74) *Attorney, Agent, or Firm* — William Park & Associates Ltd.

(57) ABSTRACT

An apparatus for spatial filtering receives a signal transmitted from a first terminal and detects a synchronization start point in time from a transmission frame included in the signal. The apparatus for spatial filtering demodulates a user-defined sequence included in the transmission frame and the at least one SRJBF sequence when the synchronization start point in time is detected, and then estimates a relative angle based on the demodulated user-defined sequence and SRJBF sequence.

6 Claims, 6 Drawing Sheets

APPARATUS AND METHOD FOR SPATIAL FILTERING BY ESTIMATING ANGLE OF DEVIATION FOR LINE OF SIGHT OF USER

CROSS-REFERENCE TO RELATED APPLICATION

This application claims priority to and the benefit of Korean Patent Application No. 10-2014-0142049 filed in the Korean Intellectual Property Office on Oct. 20, 2014, the entire contents of which are incorporated herein by reference.

BACKGROUND OF THE INVENTION (a) Field of the Invention

The present invention relates to an apparatus and a method for spatial filtering by estimating an angle of deviation for line of sight of a user.

(b) Description of the Related Art

As the number of users of portable terminals has rapidly increased, direct communication system between the terminals, such as Bluetooth or WiFi P2P, has been extended. In the direct communication system between the terminals, surrounding terminal scanning, list displaying, user selecting, and setting processes are performed until a communication link is set with the selected target device.

In these processes, a long time is required and a communication amount is increased. The user should recognize priori information on corresponding terminals, which is inconvenient. Therefore, in order to increase efficiency of direct communication between the terminals, a method capable of rapidly performing a connection and providing convenience to the user by decreasing a search range to only a target terminal is required.

In the direct communication system between a plurality of terminals present at a distance in close proximity to the user and the terminal, a beamforming technology limits the number of connectable terminals to the number of terminals present in a range of a beam to facilitate selection of a target and connection with the target. In addition, overhead used for communication may be decreased through beamforming. In the beamforming technology, the narrower the beam width, the higher capability it has of distinguishing only terminals present in a specific direction. Generally, the beam width is determined depending on the number of antennas.

The larger the number of antennas, the narrower the beam width, but the wider the space occupied by the antennas at a given frequency. Therefore, spatial resolving power is determined depending on sizes and the number of antennas that may be mounted in the portable terminals. When the number of antennas is increased at a given frequency, it is difficult to mount the increased number of antennas in the portable terminals.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method for spatial filtering.

An exemplary embodiment of the present invention provides an apparatus for spatial filtering using estimation of angle of deviation, including: a radio frequency (RF) processor receiving a signal including a transmission frame, transmitted from a first terminal, and RF-processing the received signal; a synchronization processor detecting a synchronization point in time for signal demodulation using a synchronization signal included in the transmission frame of the signal RF-processed by the RF processor; a received signal processor demodulating a user-defined sequence and spatial random jitter beamforming (SR-JBF) sequences received after the user-defined sequence when the synchronization processor detects the synchronization point in time; a sequence storage storing the user-defined sequence demodulated by the received signal processor therein; and an angle estimator estimating an angle of deviation between the apparatus and the first terminal based on a reference direction line of the apparatus by using the user-defined sequence stored in the sequence storage and the SRJBF sequences demodulated by the received signal processor.

The transmission frame may include the synchronization signal for detecting a reception start point in time of the signal, the user-defined sequence predetermined in order to estimate the angle of deviation through SRJBF, and the at least one SRJBF sequence.

Another exemplary embodiment of the present invention provides a method for spatial filtering performed by an apparatus for spatial filtering, including: receiving a signal transmitted from a first terminal and detecting a synchronization point in time from a transmission frame included in the signal; demodulating a user-defined sequence included in the transmission frame when the synchronization point in time is detected; demodulating at least one SRJBF sequence transmitted after the user-defined sequence; and estimating an angle of deviation between the apparatus and the first terminal based on a reference direction line of the apparatus by using the demodulated user-defined sequence and SRJBF sequence.

The demodulating of the user-defined sequence may include storing the demodulated user-defined sequence.

DETAILED DESCRIPTION OF THE EMBODIMENTS

Figure 1:
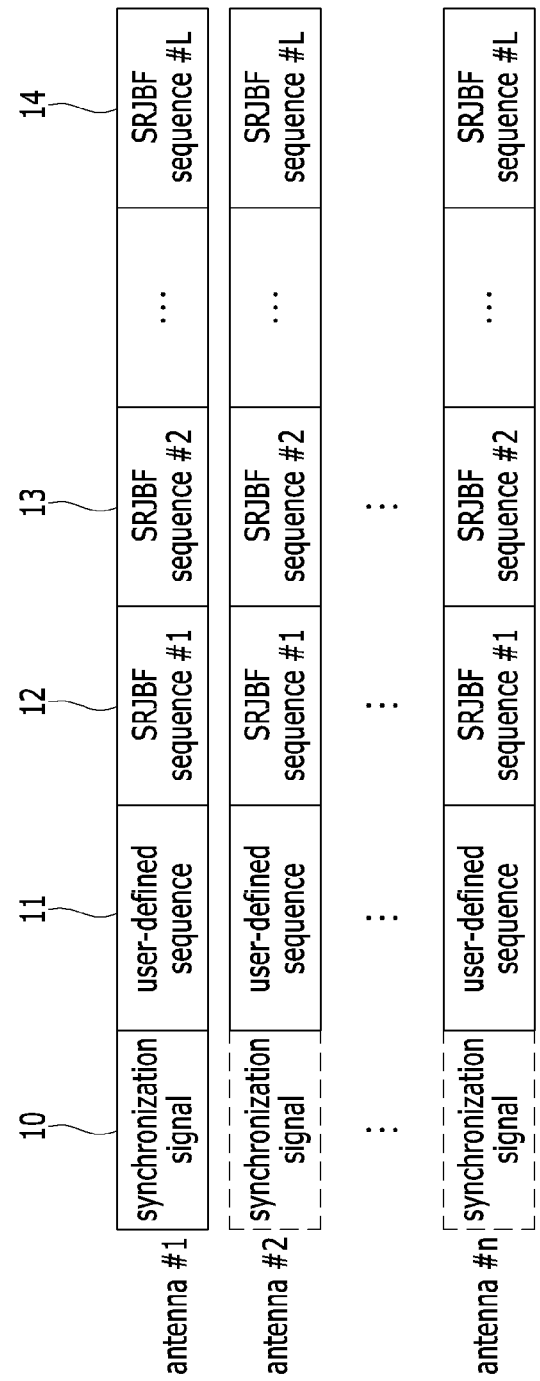
FIG. 1 is an illustrative diagram of a transmission frame structure according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the present specification, a terminal may indicate a mobile station (MS), a mobile terminal (MT), a subscriber station (SS), a portable subscriber station (PSS), user equipment (UE), an access terminal (AT), or the like, and may include all or some of the mobile terminals, the subscriber station, the portable subscriber station, the user equipment, and the like.

In the present specification, a base station (BS) may indicate an access point (AP), a radio access station (RAS), a Node B, a base transceiver station (BTS), a mobile multihop relay (MMR)-BS, or the like, and may include all or some of the access point, the radio access station, the Node B, the BTS, the MMR-BS, and the like.

Before describing an exemplary embodiment of the present invention, a spatial random jitter beamforming technology studied in order to solve problems of a general beamforming technology has an effect of decreasing a beam width without increasing the number of antennas. In addition, it has an advantage that terminals present in a look direction of a user in a target recognition field are spatially distinguished.

This technology provides a method of spatially distinguishing terminals using pre-designed beam patterns so that antenna signals are received at the same gain and phase in a specific direction (for example, 0 degree) and signals received in other directions have jittering gains and phases. Spatial filtering using this technology is performed by a principle of recognizing terminals in which cross correlation coefficient values between spatial random jitter beamforming signals and already known sequences for detecting the spatial random jitter beamforming signals are higher than a threshold value as target terminals in a receiver.

When a reception synchronization point in time of a spatial random jitter beamforming sequence is accurate, gains determined depending on directions in which array beam vectors pre-designed for beam jittering are received are added into received signals, and terminals present in a specific direction are distinguished through a detection method of the signals. However, it is very difficult to detect an ideal synchronization start point in time of the received signal passing through a wireless channel environment in a system or a network in which synchronization is not ensured.

Generally, in the case of a single antenna wireless communication system, in order to secure an accurate start point in time of the received signal, a method that may compensate for this is used. However, in the case of signals that are beamformed in a plurality of antennas, it is difficult to use an existing compensation method due to a phase component added into the received signals.

Particularly, in the case in which reception start points in time of a spatial random jitter beamforming received signal do not accord with each other, characteristics of an array beam coefficient configured of phase components are lost, such that characteristics of correlation coefficients are broken. In the case of a single antenna system, discordance of reception start points in time still remaining even though a reception synchronization error is compensated for is compensated for using a channel equalizer or the like. However, in the case of beamforming signals, since a steering vector allowing beamforming to be maintained is also offset when the channel equalizer is used, this method may not be used.

As an example of detecting a signal for a synchronization error of the spatial random jitter beamforming, in a system having multiple subcarriers, when a predetermined known sequence in a frequency domain is $\vec{X}_i$ and a frequency domain signal after this signal is received in a state in which it has a synchronization error is $\vec{Y}_j$, detection of the signals by cross correlation between the two signals is performed by the following Equation 1.

$$\rho_{ij} = \frac{<\vec{X}_i, \vec{Y}_J>}{\sqrt{\vec{X}_i, \vec{X}_i} \cdot \sqrt{\vec{Y}_J, \vec{Y}_J}} \qquad \text{(Equation 1)}$$

Here, $<\vec{X}_i, \vec{Y}_j>$ means an inner product of the two signals, that is, a correlation coefficient of two vectors. Here, when i=j, the correlation coefficient of the two signals has a value close to 1.

In the multiple subcarrier system, a received signal having a time synchronization error in the frequency domain is represented by the following Equation 2.

$$Y_k = \sum_k H_k(\theta) X_k e^{-j2\pi k \delta/N} \qquad \text{(Equation 2)}$$

Here, $H_k(\theta)$ is calculated by $H_k(\theta) = \sum_m H_k^m E_k^m(\theta) W_k^m$, $H_k^m$ means a radio channel, $\Sigma_k^k(\theta)$ means a steering vector, and $w_k^m$ means an array weight vector. In addition, k is an index of subcarriers, and m is an index of multi-array antennas. An inner product of two signals in the frequency domain and a correlation coefficient by signal detection are represented by the following Equation 3.

$$<\vec{X}, \vec{Y}> = \sum_k X_k^* Y_k = X_k^* \sum_k H_k(\theta) X_k e^{-j2\pi k \delta/N} \qquad \text{(Equation 3)}$$

$$\rho = \sum_k \frac{H_k(\theta) e^{-j2\pi k \delta/N}}{H_k}$$

When viewing the cross correlation coefficient of Equation 3, an offset component δ due to the time synchronization error appears in a form in which it is added up while being increased in proportion to the index of the subcarriers. This component allows characteristics of the correlation coefficient of the spatial random jitter beamforming method to be lost, and deteriorates an effect of spatial random jittering allowing terminals present in a specific direction to be distinguished in a target recognition field.

Therefore, in an exemplary embodiment of the present invention, a method of estimating a relative angle for a reference direction line of a terminal regardless of a reception point in time of a specific sequence is provided, and a method and an apparatus for spatial filtering of allowing a user to distinguish only target terminals present in a specific direction through relative angle information estimated using the method of estimating a relative angle in a wireless communication system is provided. For this, hereinafter, a method and an apparatus for spatial filtering using relative angle estimation will be described with reference to the accompanying drawings. In the present specification, a relative angle means an angle of deviation from line of sight (LOS) of a user. Specifically, the relative angle means an angle for a terminal (e.g., a target terminal), which is formed based on the LOS of a look direction of a user.

In an exemplary embodiment of the present invention, an example in which a principle of the spatial random jitter beamforming is used when estimating a relative angle will be described. In addition, in describing a configuration according to an exemplary embodiment of the present invention, the spatial random jitter beamforming is called SRJBF for convenience. Further, although the case of transmission SRJBF will be described by way of example in an exemplary embodiment of the present invention, this description may be similarly applied to reception beamforming, and an exemplary embodiment of the present invention includes the reception beamforming as well as the transmission beamforming.

FIG. 1 is an illustrative diagram of a transmission frame structure according to an exemplary embodiment of the present invention.

As shown in FIG. 1, a transmission frame transmitted from a Tx terminal in order to transmit a specific sequence for SRJBF is configured of a synchronization signal 10 for detecting a reception start point in time of the received signal, a predetermined user-defined sequence 11 required for estimating a relative angle through the SRJBF, an SRJBF sequence #1 12, an SRJBF sequence #2 13, and an SRJBF sequence #L 14.

Here, the user-defined sequence 11, which is a sequence used in order to calculate a correlation coefficient, is a sequence having the same meaning as that of the already known sequence of existing random jitter beamforming. The user-defined sequence 11 is a sequence commonly used for spatial random jittering signals, and two signals become equal to each other in a look direction of a user using a principle that gains and phases of the spatial random jittering signals become equal to each other when the spatial random jittering signals are received in the look direction. That is, a correlation coefficient of the two signals is 1.

Transmission of a plurality of SRJBF sequences obtains a diversity effect for a multipath channel environment. Although the case in which two SRJBF sequences are transmitted has been described by way of example, L SRJBF sequences (here, L indicates an integer) may also be transmitted, as shown in FIG. 1.

In FIG. 1, an example in which the number of antennas is N will be described, and the synchronization signals 10 are transmitted so as to not form a beam. To the contrary, in the case of a reception SRJBF, a frame structure of the reception SRJBF is the same as that of the transmission frame when a transmitter uses one antenna.

Maximum specifications of the number of transmitting and receiving antennas and an array coefficient required for forming the beam are determined depending on a capability of a system. When the system supports several kinds of antenna array configurations (for example, two, four, eight, and the like), an array coefficient required depending on the antenna array configuration is controlled by the system of the terminal.

A structure of an apparatus 100 for spatial filtering receiving the transmission frame having the above-mentioned configuration will be described with reference to FIG. 2.

Figure 2:
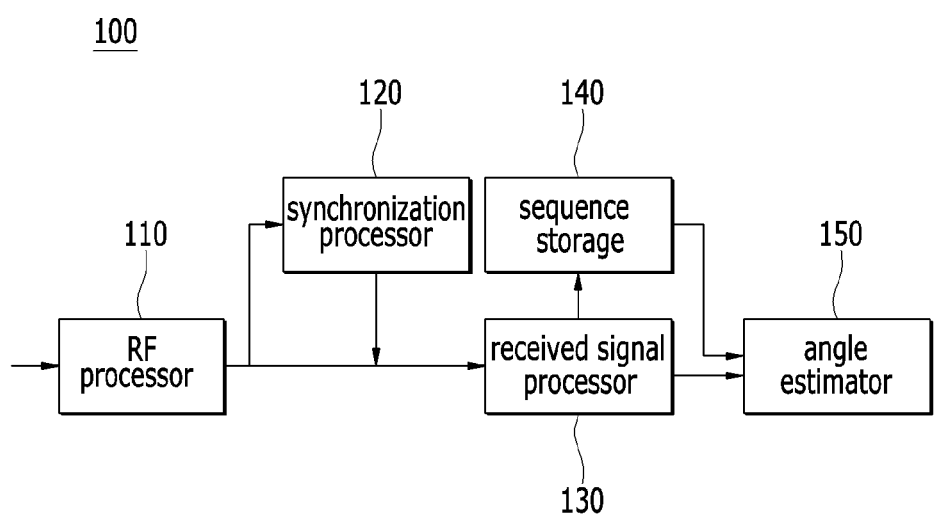
FIG. 2 is a configuration diagram of an apparatus for spatial filtering according to an exemplary embodiment of the present invention.

FIG. 2 is a configuration diagram of an apparatus for spatial filtering according to an exemplary embodiment of the present invention.

As shown in FIG. 2, the apparatus 100 for spatial filtering includes a radio frequency (RF) processor 110, a synchronization processor 120, a received signal processor 130, a sequence storage 140, and an angle estimator 150.

The RF processor 110 receives a signal having the transmission frame of FIG. 1, transmitted from a Tx terminal, and RF-processes the signal. Since a method of RF-processing the signal is well-known, a detailed description thereof will be omitted in an exemplary embodiment of the present invention. In addition, the RF processor 110 is connected to array antennas (not shown) to receive signals from the antennas.

The synchronization processor 120 detects a synchronization point in time for demodulation of a useful signal using the synchronization signal 10 in the structure of the transmission frame shown in FIG. 1. Here, the detected synchronization point in time is shared with synchronization points in time of the user-defined sequence 11 for relative angle estimation, the SRJBF #1 12, and the SRJBF #2 13.

The received signal processor 130 decides that a signal transmitted from the Tx terminal from a reception start point in time detected by the synchronization processor 120 is the user-defined sequence 11 for spatial filtering and relative angle estimation to demodulate the user-defined sequence 11. Since a method of configuring the user-defined sequence may be performed by several methods, it is not limited to any one method in an exemplary embodiment of the present invention.

The sequence storage 140 temporarily stores the demodulated use-defined sequence 11 therein when the received signal processor 130 demodulates the user-defined sequence 11. The received signal processor 130 sequentially demodulates the SRJBF sequence #1 12 and the sequence following the SRJBF sequence #1 12 during a period in which the sequence storage 140 stores the user-defined sequence therein.

The angle estimator 150 estimates a relative angle between the Tx terminal transmitting the signal and a terminal receiving the signal using the SRJBF sequences demodulated by the received signal processor 130 and the user-defined sequence temporarily stored in the sequence storage 140. A method of estimating the relative angle using both of the SRJBF sequences and the user-defined sequence will be described below.

Next, a method for spatial filtering using the apparatus for spatial filtering of FIG. 2 will be described with reference to FIG. 3.

Figure 3:
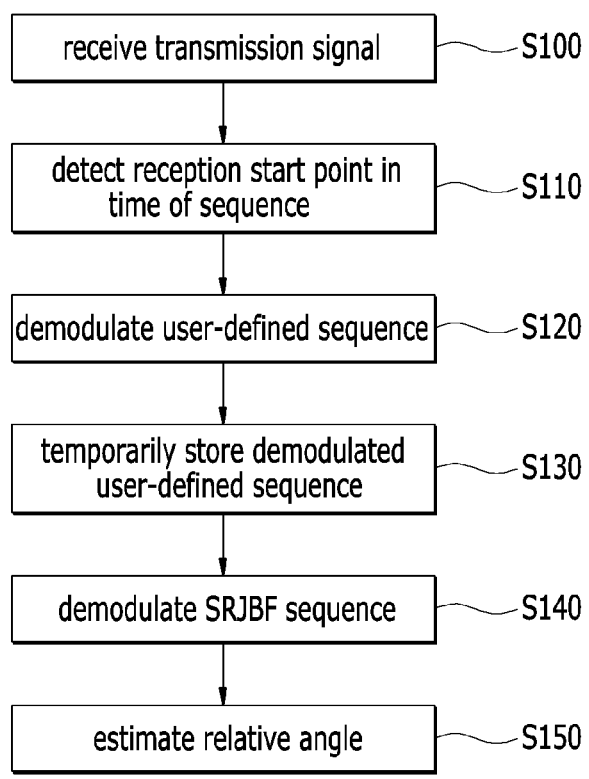
FIG. 3 is a flowchart of a method for spatial filtering according to an exemplary embodiment of the present invention.

FIG. 3 is a flowchart of a method for spatial filtering according to an exemplary embodiment of the present invention.

As shown in FIG. 3, when an Rx terminal receives the signal transmitted as the transmission frame having a form of FIG. 1 from the Tx terminal (S100), the synchronization processor 120 detects the reception start point in time of the sequence using the synchronization signal (S110).

The received signal processor 130 determines that the signal transmitted from the Tx terminal from the detected reception start point in time of the user-defined sequence is the sequence for the spatial filtering, when the synchronization processor 120 detects the reception start point in time of the user-defined sequence. Therefore, the received signal processor 130 demodulates the user-defined sequence (S120).

In addition, the sequence storage 140 temporarily stores the user-defined sequence demodulated by the received signal processor 130 therein (S130). The received signal processor 130 sequentially demodulates the SRJBF sequence #1 12 transmitted after the user-defined sequence 11 and the sequence following the SRJBF sequence #1 12 (S140) during a period in which the sequence storage 140 stores the demodulated user-defined sequence therein.

Then, the angle estimator 150 estimates the relative angle using the SRJBF sequences demodulated by the received signal processor 130 and the user-defined sequence temporarily stored in the sequence storage 140 (S150).

Next, a state in which start points in time of a received signal do not accord with each other in a system having multiple subcarriers will be described with reference to FIG. 4.

Figure 4:
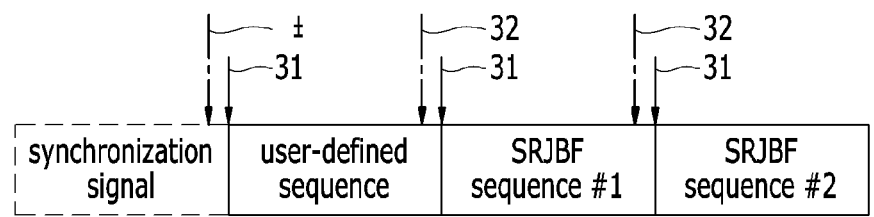
FIG. 4 is an illustrative diagram showing the case in which start points in time of a received signal do not accord with each other according to an exemplary embodiment of the present invention.

FIG. 4 is an illustrative diagram showing the case in which start points in time of a received signal do not accord with each other according to an exemplary embodiment of the present invention.

As shown in FIG. 4, in the case in which an ideal start point 31 in time of a signal for the demodulation of the received signal is different from an actual start point 32 in time of the demodulation of the received signal as described above, when a signal vector of the user-defined sequence 33 transmitted from the transmitter is $\vec{X}$, frequency domain signal vectors of the user-defined sequence 33 and the SRJBF sequence #1 34 that are received and then demodulated are $\vec{Z}$ and $\vec{Y}$, respectively, and two signals demodulated in k-subcarrier indices are $Z_k$ and $Y_k$, respectively, the received signal is represented by the following Equation 4.

$$Y_k = \sum_k H_k(\theta) X_k e^{-j2\pi k\delta/N} \quad \text{(Equation 4)}$$
$$Z_k = \sum_k H_k(\theta) X_k e^{-j2\pi k\delta/N}$$

Here, $H_k(\theta) = \sum_m H_k^m E_k^{m(\theta)} W_h^m$ and $H_k(\theta) = \sum_m H_k^m E_k^{m(\theta)}$. That is, $H_k(\theta)$ for $Y_k$ is calculated through a radio channel ($H_k^m$), a steering vector ($E_h^{m(\theta)}$), and an array weight vector ($H_k^m$), and $H_k(\theta)$ for $Z_k$ is calculated through the radio channel ($H_k^m$) and the steering vector ($E_k^{m(\theta)}$). In addition, m means an index of multi-array antennas, and $X_k$ means a user-defined sequence modulated in a k-th subcarrier.

When an offset δ is present in the reception start point in time of the signal, an inner product and a relative angle estimation value of the user-defined sequence and the SRJBF sequence, which are two received signals, are calculated using the following Equation 5.

$$\rho = \frac{<\vec{Z}, \vec{Y}>}{\sqrt{\vec{Z},\vec{Z}} \cdot \sqrt{\vec{Y},\vec{Y}}} \quad \text{(Equation 5)}$$
$$<\vec{Z}, \vec{Y}> = \sum_k Z_k^* Y_k =$$
$$\left(\sum_k H_k(\theta) X_k e^{-j2\pi k\delta/N}\right)^* \left(\sum_k H_k(\theta) X_k e^{-j2\pi k\delta/N}\right)$$
$$\rho = \sum_k \frac{H_k^*(\theta) H_k(\theta)}{\{H_k(\theta)\}^2}$$

Here, ρ is a correlation coefficient used in order to estimate the relative angle, a first ρ is to show a signal configuration of the correlation coefficient, and a second ρ shows a resultant value of actual mathematical calculation of two signals. (·)* means a conjugate operation, and an inner product of two vectors is defined as $<\vec{Z}, \vec{Y}> = \sum_i Z_k^* Y_k$, N means the number of subcarriers of OFDM (Orthogonal Frequency Division Multiplexing).

Even though the offset δ is present in the reception start point in time, the offset δ disappears in the relative angle estimation value of Equation 3 in a process of estimating the relative angle, such that the offset does not have an influence on the relative angle estimation value. Here, ρ is a correlation coefficient of the user-defined sequence and the SRJBF sequence #1, which are the two received signals. As ρ becomes close to 1, a relative angle shown in FIG. 5 to be described below becomes 0, and as ρ is gradually decreased, the relative angle becomes wide.

An example of spatial filtering using the method and the apparatus for spatial filtering described above will be described with reference to FIG. 5.

Figure 5:
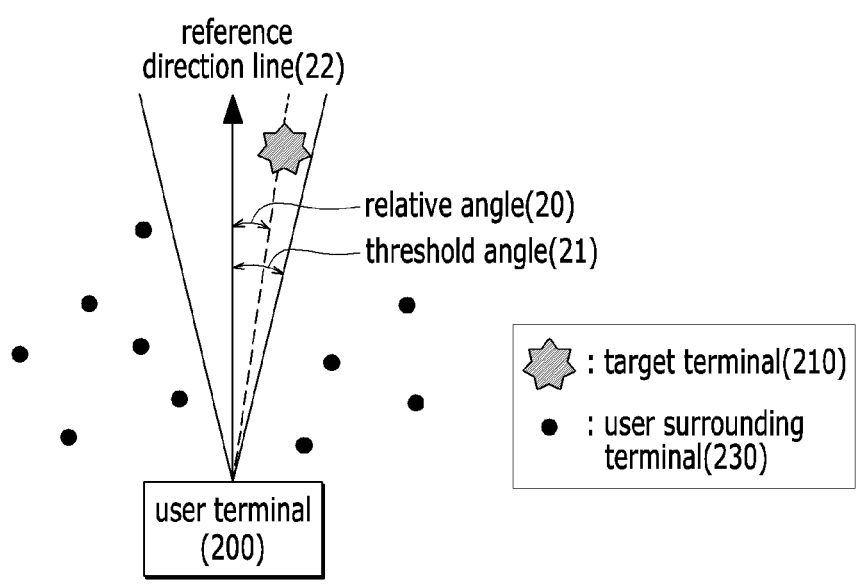
FIG. 5 is an illustrative view of spatial filtering according to an exemplary embodiment of the present invention.

FIG. 5 is an illustrative view of spatial filtering according to an exemplary embodiment of the present invention.

As shown in FIG. 5, a relative angle 20 is an angle between a user terminal 200 and a target terminal 210 or between the user terminal 200 and user surrounding terminals 230 based on a reference direction line 22 of the user terminal 200. For example, the relative angle 20 means an angle between the reference direction line 20 and a line that is formed by the user terminal 200 and the target terminal 210.

The reference direction line 22 of the user terminal 200 is the broad side (vertical direction of an antenna array of the user terminal 200) of an antenna array. Describing a method of estimating the relative angle 20 in an exemplary embodiment of the present invention, the correlation coefficient value of the two signals, that is, the user-defined sequence and the SRJBF sequence, is estimated as the relative angle of direction of the Rx terminal (e.g., 210 or 230) for the Tx terminal (e.g., 200). The correlation coefficient ρ calculated in Equation 3 may be nearly mapped as the relative angle. The target terminal 210 or the user surrounding terminals 230 may perform the method of estimating the relative angle 20.

Here, through a filtering threshold angle 21 set by a user or preset in the Rx terminal (e.g., 230), the Rx terminal (e.g., 230) decides whether or not it is the target terminal 210. Alternatively, the Rx terminal (e.g., 230) transmits this information to the user terminal 200 to allow the user terminal 200 to determine the Rx terminal (e.g., 230) to the target terminal 210.

Although the received signal in the frequency domain has been described by way of example in an exemplary embodiment of the present invention, the same principle may be applied to a receive signal in a time domain. In addition, an exemplary embodiment of the present invention includes a method of estimating a relative angle for the received signal in the time domain as well as the received signal in the frequency domain.

As an exemplary embodiment of the present invention, the transmission frame of FIG. 1 is configured of different kinds of multiple sequences such as the 'SRJBF sequence #1 12' and the 'SRJBF sequence #2 13', and is transmitted. In addition, the Rx terminals obtain a diversity gain for the method of estimating the relative angle using a method such as a method of 'selecting' or 'synthesizing' the relative angle estimation values for the sequences, respectively. Any one of the 'selection' and the 'syntheses' may be selected by a system implementer at the time of configuring a system, and the case of selecting any one of the 'selection' and the 'syntheses' will not be described in an exemplary embodiment of the present invention.

For example, in the case of transmitting one frame configured of a conjugate for the SRJBF sequence, a correlation coefficient of the 'SRJBF sequence #1 12' and the 'SRJBF sequence #2 13' is selected as the SRJBF sequence value for estimating the relative angle. Alternatively, filtering may also be performed using the fact that characteristics of the relative angle estimated from the 'SRJBF sequence #1 12', the 'SRJBF sequence #1 12', and the relative angle obtained from 'SRJBF sequence #2 13' are different from each other. In order to obtain the diversity gain, the transmission frame may either variously configure the SRJBF sequences as shown in FIG. 1, or transmit the SRJBF sequences over several periods, which are divided by reflecting time-variant characteristics of a channel.

Figure 6:
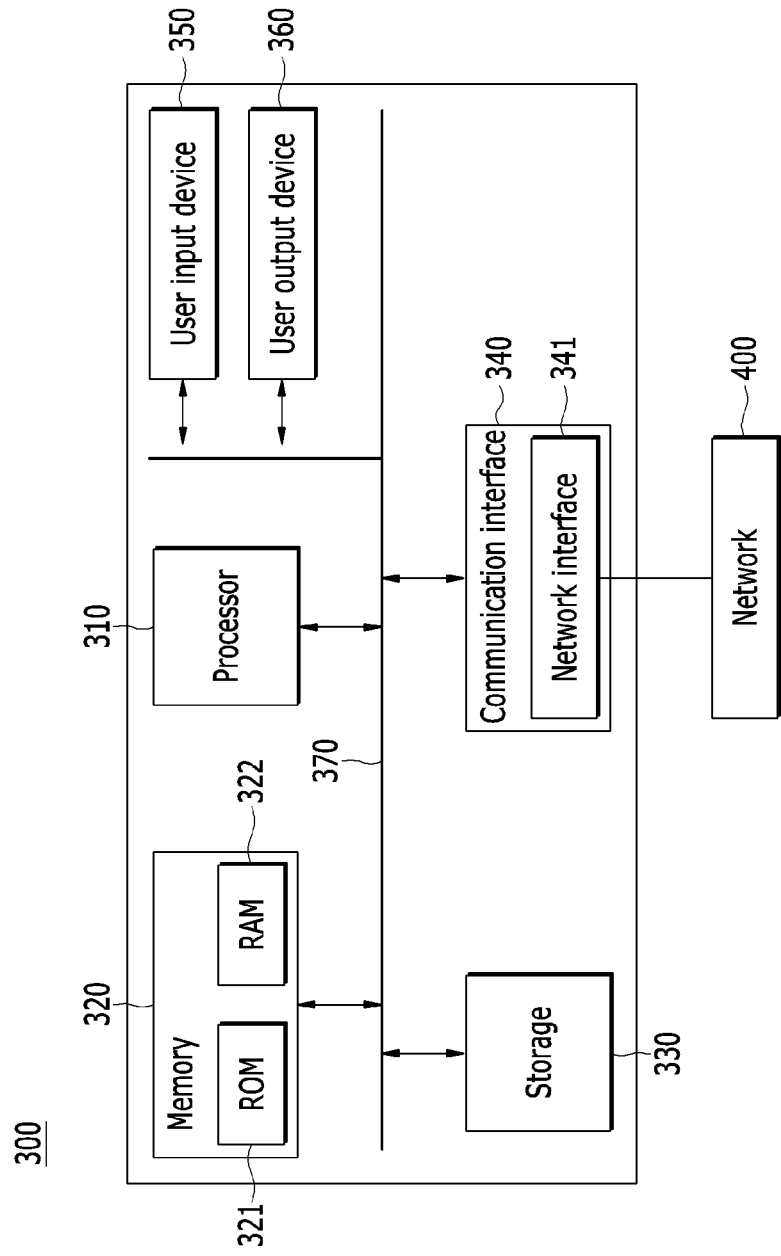
FIG. 6 is a view illustrating a computer system according to an exemplary embodiment of the present invention.

Meanwhile, an embodiment of the present invention may be implemented in a computer system, e.g., as a computer readable medium. As shown in FIG. 6, a computer system 300 may include one or more of a processor 310, a memory 320, and a storage 330. The computer system 300 may further include a communication interface 340. The communication interface 340 may include a network interface 341 that is coupled to a network 400. The computer system 300 may further include a user input device 350 and a user output device 360. Each of elements 310-360 may communicates through a bus 370.

The processor 310 may be a central processing unit (CPU) or a semiconductor device that executes processing instructions stored in the memory 320 and/or the storage 330. The memory 320 and the storage 330 may include various forms of volatile or non-volatile storage media. For example, the memory 320 may include a read-only memory (ROM) 321 and a random access memory (RAM) 322.

Accordingly, an embodiment of the invention may be implemented as a computer implemented method or as a non-transitory computer readable medium with computer executable instructions stored thereon. In an embodiment, when executed by the processor 310, the computer executable instructions may perform a method according to at least one aspect of the invention.

According to an exemplary embodiment of the present invention, when a connection to target terminals selected by a user is to be performed in a wireless communication system in which a plurality of terminals are present in a distance in close proximity to the user, the number of connectable terminals is spatially limited to the number of terminals present in a specific direction, thereby making it possible to rapidly and simply set the connection to the target terminals.

A search range of terminals is narrowed to terminals in a specific direction, thereby making it possible to decrease communication overhead between apparatuses used to search for the connectable terminals.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for spatial filtering, comprising:
a radio frequency (RF) processor receiving a signal including a transmission frame, transmitted from a first terminal, and RF-processing the received signal;
a synchronization processor detecting a synchronization point in time for signal demodulation using a synchronization signal included in the transmission frame of the signal RF-processed by the RF processor;
a received signal processor demodulating a user-defined sequence and spatial random jitter beamforming (SRJBF) sequences received after the user-defined sequence when the synchronization processor detects the synchronization point in time;
a sequence storage storing the user-defined sequence demodulated by the received signal processor therein; and
an angle estimator estimating an angle of deviation between the apparatus and the first terminal based on a reference direction line of the apparatus by using the user-defined sequence stored in the sequence storage and the SRJBF sequences demodulated by the received signal processor.

2. The apparatus for spatial filtering of claim 1, wherein the transmission frame includes the synchronization signal for detecting a reception start point in time of the signal, the user-defined sequence predetermined in order to estimate the angle of deviation through SRJBF, and the at least one SRJBF sequence.

3. A method for spatial filtering performed by an apparatus for spatial filtering, comprising:
receiving a signal transmitted from a first terminal and detecting a synchronization point in time from a transmission frame included in the signal;
demodulating a user-defined sequence included in the transmission frame when the synchronization point in time is detected;
demodulating at least one spatial random jitter beamforming (SRJBF) sequence transmitted after the user-defined sequence; and
estimating an angle of deviation between the apparatus and the first terminal based on a reference direction line of the apparatus by using the demodulated user-defined sequence and SRJBF sequence.

4. The method for spatial filtering of claim 3, wherein the demodulating of the user-defined sequence includes storing the demodulated user-defined sequence.

5. The method for spatial filtering of claim 3, wherein, in the estimating of the angle of deviation, the angle of deviation is estimated through $$\rho = \frac{<\vec{Z}, \vec{Y}>}{\sqrt{\vec{Z}, \vec{Z}} \cdot \sqrt{\vec{Y}, \vec{Y}}}$$

$$<\vec{Z}, \vec{Y}> = \sum_k Z_k^* Y_k = \left(\sum_k H_k(\theta) X_k e^{-j2\pi k\delta/N}\right)^* \left(\sum_k H_k(\theta) X_k e^{-j2\pi k\delta/N}\right)$$

$$\rho = \sum_k \frac{H_k^*(\theta) H_k(\theta)}{\{H_k(\theta)\}^2}$$

where $\rho$ is a correlation coefficient of the use-defined sequence and the SRJBF sequence, $<\vec{Z}, \vec{Y}>$ is an inner product of a frequency domain signal of the use-defined sequence and a frequency domain signal of the SRJBF sequence, $H_k(\theta)$ is calculated through a radio channel ($H_k^m$), a steering vector ($E_k^{m(\theta)}$), and an array weight vector ($w_k^m$), $H_k(\theta)$ is calculated through the radio channel ($H_k^m$) and the steering vector ($E_k^{m(\theta)}$), $X_k$ means a user-defined sequence modulated in a k-th subcarrier, $\delta$ is an offset component due to a time synchronization error, m means an index of multi-array antennas, N is the number of subcarriers, and $(\cdot)^*$ means a conjugate operation.

6. The method for spatial filtering of claim 3, wherein, in the estimating of the angle of deviation, in the case in which the number of SRJBF sequences is one or more, any one of a plurality of SRJBF sequences is selected or the plurality of SRJBF sequences are synthesized to be used to estimate the angle of deviation.

* * * * *